United States Patent
Minto et al.

(10) Patent No.: US 10,676,155 B2
(45) Date of Patent: Jun. 9, 2020

(54) DEVICE FOR ACTUATING A FRONT DERAILLEUR OF A BICYCLE

(71) Applicant: Campagnolo S.r.l., Vicenza (IT)

(72) Inventors: Marco Minto, Mirano (IT); Christian Marangon, Thiene (IT)

(73) Assignee: Campagnolo S.r.l., Vicenza (IT)

( * ) Notice: Subject to any disclaimer, the term of this patent is extended or adjusted under 35 U.S.C. 154(b) by 17 days.

(21) Appl. No.: 16/037,525

(22) Filed: Jul. 17, 2018

(65) Prior Publication Data

US 2019/0031289 A1  Jan. 31, 2019

(30) Foreign Application Priority Data

Jul. 26, 2017 (IT) .................. 102017000085704

(51) Int. Cl.
  *B62M 25/04* (2006.01)
  *B62K 23/06* (2006.01)
  *B62M 9/131* (2010.01)

(52) U.S. Cl.
  CPC ............. *B62M 25/04* (2013.01); *B62K 23/06* (2013.01); *B62M 9/131* (2013.01)

(58) Field of Classification Search
  CPC .... B62M 25/04; B62M 25/045; B62M 9/131; B62M 9/134; B62K 23/06; B62K 23/04
  See application file for complete search history.

(56) References Cited

U.S. PATENT DOCUMENTS

| | | | |
|---|---|---|---|
| 4,736,651 A * | 4/1988 | Nagano | B62M 25/04 74/473.14 |
| 4,900,291 A | 2/1990 | Patterson | |
| 5,787,757 A | 8/1998 | Ozaki | |
| 6,132,327 A | 10/2000 | Campagnolo | |
| 7,285,064 B2 | 10/2007 | Ichida et al. | |
| 8,485,060 B2 | 7/2013 | Emura et al. | |
| 2004/0200307 A1 | 10/2004 | Mitchell | |
| 2005/0193856 A1 * | 9/2005 | Dal Pra | B62K 23/06 74/502.2 |
| 2008/0087126 A1 | 4/2008 | Oda et al. | |

OTHER PUBLICATIONS

Italian Search Report and Written Opinion in Italian Application No. 102017000085704, dated Apr. 30, 2018, with English translation.

* cited by examiner

*Primary Examiner* — Daniel D Yabut
(74) *Attorney, Agent, or Firm* — Volpe and Koenig, P.C.

(57) ABSTRACT

A device for actuating a bicycle front derailleur and displacing a transmission chain between toothed wheels of different diameters. An indexer associated with the derailleur comprises a first stop position and a second stop position. The first stop corresponds to engagement of the transmission chain on a first toothed wheel and the second stop position corresponds to engagement of the transmission chain on a different toothed wheel. A control lever operatively active on the indexer switches between the stop positions with a single actuation of the control lever.

16 Claims, 6 Drawing Sheets

DEVICE FOR ACTUATING A FRONT DERAILLEUR OF A BICYCLE

CROSS REFERENCE TO RELATED APPLICATION

This application claims the benefit of Italian Patent Application No. 102017000085704, filed on Jul. 26, 2017, which is incorporated herein by reference as if fully set forth.

FIELD OF INVENTION

The present invention relates to a device for actuating a front derailleur of a bicycle, adapted for being mounted on bicycle handlebars. Preferably, the bicycle is a racing bicycle.

BACKGROUND

A bicycle is normally provided with a rear derailleur active on a sprocket assembly, which consists of a series of coaxial toothed wheels (sprockets), having different diameters and numbers of teeth, coupled with the hub of the rear wheel.

A bicycle can furthermore also be provided with a front derailleur associated with a crankset, which consists of a series of toothed wheels (crown gears) having different diameters and numbers of teeth associated with a pin of the bottom bracket set in rotation by a pair of pedals.

Usually, the crown gears of the crankset are two or three in number having increasing diameters from the crown gear closest to the bicycle frame.

The derailleur, whether front or rear, engages a transmission chain extending in a closed loop between the sprocket assembly and the crankset, which is displaced onto toothed wheels of different diameters and numbers of teeth, so as to obtain different gear ratios.

In particular, downward gearshifting is said when the chain passes from a toothed wheel of larger diameter to a toothed wheel of smaller diameter, whereas upward gearshifting is said when the chain moves from a toothed wheel of smaller diameter to a toothed wheel of larger diameter. Concerning this, it should be noted that with reference to the front derailleur, downward gearshifting corresponds to the passage to a lower gear ratio and upward gearshifting corresponds to the passage to a higher gear ratio.

The displacement in the two directions of the front derailleur is obtained through an actuation device mounted on the handlebars so as to be easily maneuvered by the cyclist.

More in particular, in a mechanical gearshift, the front derailleur is moved between the crown gears of the crankset, in a first direction (upwards) by a traction action exerted by a normally-sheathed inextensible control cable (commonly called Bowden cable), in a second opposite direction (downward) by the release of the traction of the cable and by the elastic return action of a spring provided in the derailleur itself.

The front derailleur is actuated by a linkage that actuates a chain guide adapted for physically displacing the chain between different engagement positions on the crown gears.

The chain guide comprises an inner plate and an outer plate substantially parallel to one another and substantially parallel to the planes on which the crown gears lie. The inner plate is spaced from the outer plate and both are simultaneously and rigidly translated by the traction or release of the control cable.

During downward gearshifting, the outer plate of the derailleur intercepts the chain and derails it from the crown gear engaged making it fall onto a smaller crown gear arranged closer to the frame.

During upward gearshifting, the inner plate of the derailleur intercepts the chain and derails it, accompanying it, towards a larger crown gear arranged farther from the frame.

In the actuation device, the control cable is actuated in traction or in release through winding and unwinding on a rotor element, commonly called cable-winding bush, the rotation of which is actuated by the cyclist with a suitable control lever, or with two control levers (a first lever for upward gearshifting and a second lever for downward gearshifting).

In any case, the actuation device must provide for the cable-winding bush to be held still in rotation in a number of predetermined angular positions, angularly spaced apart by predetermined indexing angles. This function is obtained with the so-called indexers, many types of which are known in the prior art, variously active between the cable-winding bush and the fixed casing of the device.

Usually, the indexer comprises more than one stop position to position the front derailleur at the smallest crown gear of the crankset, as illustrated for example in document U.S. Pat. No. 8,485,060 and in document U.S. Pat. No. 7,285,064.

The cyclist, therefore, actuates the control lever to engage the most appropriate stop position as a function of the toothed wheel of the cassette engaged by the chain when the latter is on the smallest crown gear of the crankset.

The Applicant has perceived that it is essential to ensure a correct passage of the transmission chain between the largest crown gear and the smallest crown gear during downward gearshifting from the largest crown gear of the crankset.

SUMMARY

The present invention relates to a bicycle front derailleur actuator device that displace a transmission chain between a first toothed wheel and a second toothed wheel of a smaller a diameter, i.e. downshifts the chain. The derailleur actuator has an indexer operatively active on the front derailleur and comprising a first lower stop position and a second lower stop position at which the transmission chain is engaged on the second toothed wheel and the second lower stop position centers the front derailleur on the second toothed wheel. The indexer further comprises a first upper stop position corresponding to an engagement of the transmission chain on the first toothed wheel. at least one control lever is operatively active on the indexer to switch between the first lower stop position, the second lower stop position, and the first upper stop position, wherein with a single actuation of the control lever the indexer is switched from the first upper stop position to the second lower stop position.

BRIEF DESCRIPTION OF THE DRAWING(S)

The features and advantages of the invention will become clearer from the following description of preferred embodiments thereof, made with reference to the attached drawings. In such drawings.

DETAILED DESCRIPTION OF THE PREFERRED EMBODIMENTS

The present invention therefore relates to a device for actuating a front derailleur of a bicycle to displace a transmission chain between a first toothed wheel and a second toothed wheel having a smaller diameter than the diameter of the first toothed wheel, comprising:

an indexer operatively active on the front derailleur and comprising a first lower stop position and a second lower stop position at which the transmission chain is engaged on the second toothed wheel, wherein the second lower stop position is configured to center the front derailleur on the second toothed wheel;

said indexer comprising a first upper stop position corresponding to an engagement of the transmission chain on the first toothed wheel;

at least one control lever operatively active on said indexer to switch it between the first lower stop position, the second lower stop position and the first upper stop position, wherein with a single actuation of the control lever the indexer is switched from the first upper stop position to the second lower stop position.

Under "single actuation" of the control lever it is meant a continuous stroke along a single direction of the control lever between a first and a second position.

In this way, when the cyclist commands the displacement of the derailleur from the first crown gear (the one having a greater diameter) to the second toothed wheel (the one having a smaller diameter), the front derailleur is always positioned centered on the second toothed wheel.

The Applicant has found that this allows downward gearshifting that is always efficient irrespective of the gear on the cassette engaged by the transmission chain.

The Applicant has indeed noted that downward gearshifting that takes the transmission chain from the first toothed wheel to the first lower stop position (the one closest to the end of stroke of the front derailleur) could take the transmission chain beyond the second toothed wheel with consequent falling of the transmission chain from the second toothed wheel.

The device for actuating the front derailleur of a bicycle of the present invention can comprise one or more of the following preferred features, taken individually or in combination.

Preferably, said indexer comprises a third lower stop position at which the transmission chain is engaged on the second toothed wheel; said second lower stop position being arranged between the first lower stop position and the third lower stop position.

The Applicant has noted that downward gearshifting to pass from the first toothed wheel to the second toothed wheel could fail, in other words not take place, in the case in which the front derailleur positions the transmission chain at the first useful position (the third lower stop position) on the second toothed wheel, especially when the transmission chain is engaged on the sprockets having a smaller diameter of the cassette.

Preferably, said indexer comprises a second upper stop position at which the transmission chain is engaged on the first toothed wheel; said second upper stop position being further from the second lower stop position with respect to the first upper stop position; a single actuation of the control lever switching the indexer from the second upper stop position to the second lower stop position.

Under the term "closer" or "further" when referring to the stop positions it is meant the distance that separates the stop positions. Such a distance can be referred to the excursion that the front derailleur must perform to pass between two stop positions or to the angular distance or to the linear distance that separates two stop positions (as will become clearer hereinafter).

The second upper stop position makes it possible to position the transmission chain on the first toothed wheel in a position closer to the upper end stop of the front derailleur, so as to allow the transmission chain to engage the smaller toothed wheels of the rear cassette without the transmission chain sliding against the outer plate of the chain guide of the front derailleur.

Preferably, the first upper stop position can only be reached from the second upper stop position.

The Applicant has noted that upward gearshifting requires the inner plate of the front derailleur to accompany the transmission chain until it engages the larger toothed wheel.

The second upper stop position ensures that the transmission chain is effectively accompanied on the first toothed wheel irrespective of the toothed wheel of the cassette engaged by the transmission chain.

Preferably, during upward gearshifting from the second toothed wheel towards the first toothed wheel, the transmission chain always reaches the second upper stop position.

In this way, upward gearshifting to take the transmission chain from the second toothed wheel to the first toothed wheel is always quick and effective.

Preferably, a cable-winding bush is provided that is actuated by said control lever to rotate around a rotation axis in a first angular direction between a last angular position, corresponding to the second upper stop position of the indexer, and a first angular position, corresponding to the first lower stop position of the indexer, and in a second angular direction between the first angular position and the last angular position;

wherein said indexer comprises:

a ball-carrying disc, rotating as a unit with said cable-winding bush, comprising at least one pointer;

an indexing bush provided with a fastening track engaged by said pointer and comprising at least some of said lower and upper stop positions to stop said ball-carrying disc at some of said lower and upper stop positions.

Rotations of the cable-winding bush in the first angular direction correspond to downward gearshifting whereas rotations of the cable-winding bush in the second angular direction correspond to upward gearshifting.

The lower and upper stop positions arranged along the fastening track on which the pointer slides allow the pointer, and therefore the cable-winding bush, to reach angular positions corresponding to positions of the front derailleur useful for carrying out gearshifting on the toothed wheels of the crankset and, preferably, to obtain many positions of the front derailleur when the transmission chain engages the smallest crown gear of the crankset.

These angular positions of the pointer and of the cable-winding bush can be reached in sequence during gearshifting, for example upward, when the cyclist actuates the control lever.

Preferably, said fastening track comprises a first fastening path and a second fastening path; said ball-carrying disc comprising a first pointer engaged on said first fastening path and a second pointer engaged in said second fastening path.

In this way, it is possible to provide a pointer for the lower stop positions at which the derailleur is arranged on the second toothed wheel (the smallest one) and a pointer for the upper stop position(s) at which the derailleur is arranged on the first toothed wheel (the largest one).

This can make it possible to arrange fastening paths specially configured for the stop positions of the second toothed wheel and fastening paths specially configured for the stop positions of the first toothed wheel.

The Applicant has indeed noted that the return force of the spring of the front derailleur (which tends to take it back to the lower end stop) is greater when the indexer positions the front derailleur at the first toothed wheel and is less when the indexer positions the front derailleur at the second toothed wheel.

The Applicant has found that the pair of forces that the indexer must bear when the derailleur is at the second toothed wheel is less than the pair of forces that the indexer must bear when the derailleur is at the first toothed wheel.

The Applicant has perceived that the sizing of the lower and upper stop positions and of the pointers can be different for the lower stop positions and for the upper stop positions and for the respective pointers.

Preferably, said second pointer is smaller in size with respect to said first pointer.

In this way, the lower stop positions engaged by the second pointer can be smaller in size than the upper stop positions engaged by the first pointer.

The Applicant has perceived that this makes it possible to arrange lower stop positions engaged by the second pointer closer together with respect to the upper stop positions engaged by the first pointer.

Preferably, said first and second lower stop position and said second and third lower stop position are angularly separated from one another by angles smaller than the angle that separates the first from the second upper stop position.

In this way it is possible to obtain stable positions of the front derailleur closer together at the second toothed wheel with respect to the stable positions of the front derailleur at the first toothed wheel, allowing a finer adjustment of the front derailleur at the second toothed wheel.

Furthermore, it is possible to provide, for the same total excursion of the front derailleur, a greater number of stable positions thereof (in other words a greater number of stop positions of the indexer), ensuring greater versatility of the derailleur.

Preferably, said first, second and third lower stop positions are formed on said second fastening path and said first upper stop position is formed on the first fastening path.

Preferably, said first upper stop position is formed outside of said first fastening path and is radially aligned with said second upper stop position.

The Applicant has perceived that by arranging the first upper stop position outside of the first fastening path and, therefore, unable to be reached during the normal sliding of the first pointer in the first fastening path, it is possible to obtain an angular position of the cable-winding bush, and therefore a position of the front derailleur, not immediately reachable when the upward gearshifting operations are carried out following the first fastening path.

In this way, the first upper stop position (which in the second angular direction precedes the second upper stop position) can be used to move the front derailleur by an amount not sufficient to carry out downward gearshifting but sufficient to reposition the derailleur at the larger crown gear to compensate for different positioning of the transmission chain on the toothed wheels of the cassette.

The size of the front derailleur, and in particular the distance between the two chain-guiding plates, can therefore be decreased without compromising the possibility of using the entire cassette when the transmission chain is on the largest crown gear of the crankset.

Preferably, said first fastening path comprises a free sliding area for said first pointer; said first pointer engaging said free sliding area when the second pointer is in the first, second or third lower stop position.

In this way, when the indexer is in the lower stop positions, the first pointer is unable to constrain in rotation the ball-carrying disc, remaining free from the engagement with the upper stop positions and allowing the second pointer to move between the lower stop positions.

Preferably, said second fastening path comprises a free sliding area for said second pointer; said second pointer engaging said free sliding area when the first pointer is in the first upper stop position or in the second upper stop position.

In this way, when the indexer is in the upper stop positions, the second pointer is unable to constrain in rotation the ball-carrying disc, remaining free from the engagement with the lower stop positions and allowing the first pointer to move between the upper stop positions.

Preferably, a first control lever is provided to set said cable-winding bush in rotation in the first angular direction and a second control lever is provided to set said cable-winding bush in rotation in the second angular direction; said first control lever being directly active on said ball-carrying disc.

Preferably, said ball-carrying disc comprises a plurality of protrusions able to be engaged by a tooth of the first control lever; the ball-carrying disc rotating in said first angular direction following the engagement of said tooth in one of said protrusions during the actuation of the first control lever in the first angular direction.

Preferably, said first control lever is rotatable about said rotation axis between an upper end stop and a lower end stop; the angular distance that separates the upper end stop from the lower end stop being equal to the angular distance between the second upper stop position and the second lower stop position.

In this way, a complete stroke of the first control lever, in other words a continuous stroke without interruptions of the first control lever, corresponds to the passage from the second upper stop position to the second lower stop position of the indexer.

With reference now to the attached figures, a preferred embodiment of a device for actuating a front derailleur of a bicycle in accordance with the present invention is shown. The actuation device is wholly indicated with 10.

Figure 1:
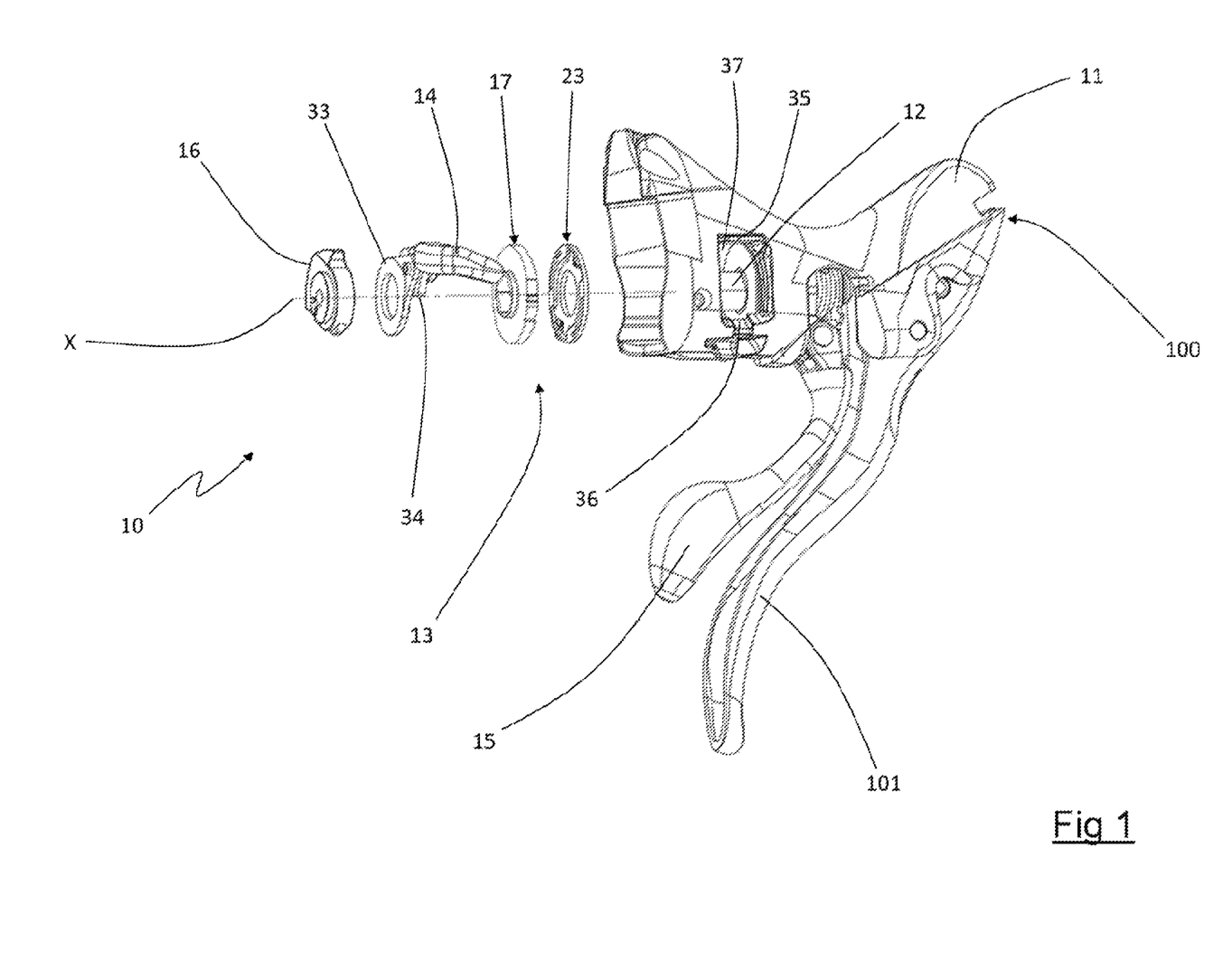
FIG. 1 is an exploded perspective view of a device for actuating a front derailleur of a bicycle according to the invention.

Preferably, the actuation device 10 is included in an integrated brake-gearshift actuation device 100 of the bicycle, as shown in FIG. 1.

Figure 9:
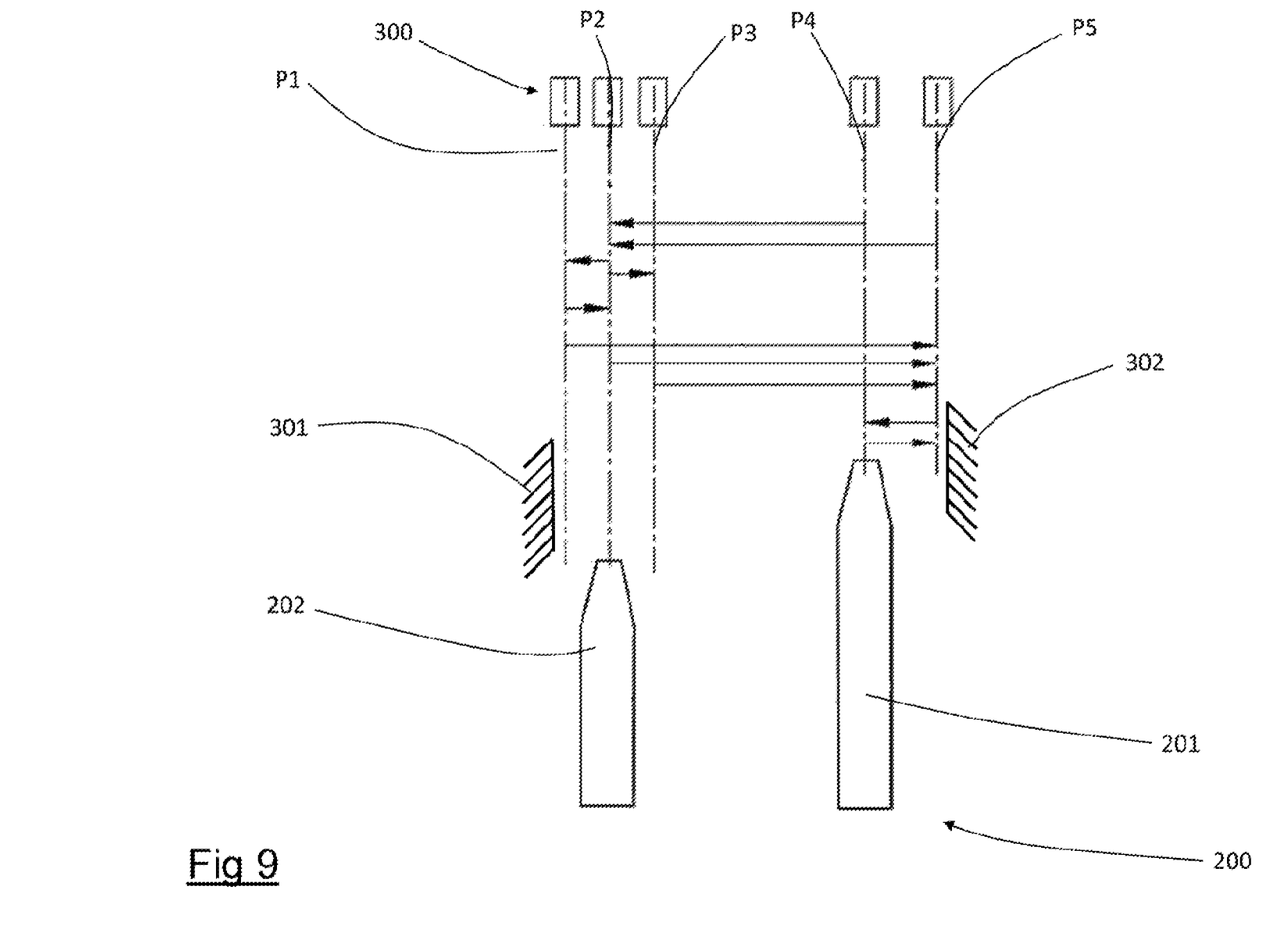
FIG. 9 is a schematic view of the positions of a front derailleur, actuated by the device of the present invention.

The attached figures show the actuation device 10 used to change the gear ratios on a crankset 200, illustrated schematically in FIG. 9, through a front derailleur 300 of the bicycle.

The device 10 comprises a casing 11 (FIG. 1), which is fixed to the handlebars of a bicycle in a conventional manner, for example through a strap (not illustrated), that preferably also constrains a brake lever 101 to the handlebars (FIG. 1).

In the casing 11 a central pin 12 is provided, which is rotatable inside the casing 11 about a rotation axis X. The rotation axis X is the main reference axis for the elements that form part of the device 10; all of the indications of direction and similar, such as "axial", "radial", "circumferential", "diametral" will refer to it; equally, the indications "outwards" and "inwards" referring to radial directions must be interpreted as away from the rotation axis X or towards the rotation axis X. Two opposite angular directions are defined around the rotation axis X—a first A and a second angular direction B, respectively, shown in FIGS. 2-5.

The device 10 comprises an indexer 13 which is configured to drive the front derailleur 300 between a plurality of operative positions corresponding to positions of a transmission chain (not illustrated) on a first toothed wheel 201 and on a second toothed wheel 202 of the crankset 200.

The operative positions that the front derailleur 200 can take up are determined by stop positions P1, P2, P3, P4 and P5 of the indexer 13.

The first toothed wheel 201 is arranged more externally than the second toothed wheel 202 with respect to the bicycle frame.

The first toothed wheel 201 has a greater diameter and number of teeth than the second toothed wheel 202.

As schematically indicated in FIG. 9, the indexer 13 comprises a first lower stop position P1, a second lower stop position P2 and a third lower stop position P3 corresponding to respective positions of the front derailleur 200 at the second toothed wheel 202.

In particular, the first lower stop position P1 corresponds to a position of the derailleur 300 substantially adjacent to a lower end stop 301 of the derailleur, the third lower stop position P3 corresponds to a position of the derailleur 300 further from the lower end stop 301 and the second lower stop position P2 corresponds to an intermediate position of the derailleur 300 between the first P1 and the third P3 lower stop position.

The second lower stop position P2 is preferably such as to perfectly center the transmission chain on the second toothed wheel 202, as schematized in FIG. 9.

The indexer 13 further comprises at least one first upper stop position P4 at which the derailleur 300 is arranged on the first toothed wheel 201.

In particular, the first upper stop position P4 corresponds to a position of the derailleur 300 that allows a correct use thereof when the transmission chain is engaged with the larger sprockets of the cassette.

In the preferred embodiment of the invention, the indexer comprises a second upper stop position P5 corresponding to a position of the derailleur 300 substantially adjacent to the upper end stop 302 of the derailleur 300.

It should be noted that the second upper stop position P5 is further from the first lower stop position P1, from the second lower stop position P2 and from the third lower stop position P3 with respect to the first upper stop position P4.

The switching of the indexer 13 between the stop positions P1, P2, P3, P4, P5 is actuated by at least one control lever 14.

Preferably, a first control lever 14 is provided to actuate the indexer 13 during downward gearshifting, in other words from the second upper stop position P5 towards the first lower stop position P1, and a second control lever 15 is provided to actuate the indexer 13 during upward gearshifting, in other words from the first lower stop position P1 towards the second upper stop position P5.

As schematized in FIG. 9, during downward gearshifting, from the first toothed wheel 201, the indexer 13 is always switched in the second lower stop position P2.

In particular, during downward gearshifting from the first upper stop position P4, the indexer 13 takes the derailleur to the second lower stop position P2 centering the transmission chain on the second toothed wheel 202.

Furthermore, in order to actuate downward gearshifting that takes the transmission chain onto the second toothed wheel 202 from the second upper stop position P5, the indexer 13 always takes the derailleur to the second lower stop position P2 centering the transmission chain on the second toothed wheel 202.

In other words, during downward gearshifting from the first toothed wheel 201, the indexer 13, although it transits by the third lower stop position P3, does not stably engage the third lower stop position P3.

The passage from the first upper stop position P4 or from the second upper stop position P5 to the second lower stop position P2 takes place with a single actuation of the first control lever 14, in other words with a single continuous movement of the first control lever 14.

When the derailleur 300 is positioned at the second lower stop position P2, the indexer 13 can be actuated to reach, on the second toothed wheel 202, the first lower stop position P1 or the third lower stop position P3.

In order to reach the first lower stop position P1 it is necessary to carry out downward gearshifting by acting on the first control lever 14, whereas to reach the third lower stop position P3 it is necessary to carry out upward gearshifting by acting on the second control lever 15.

During upward gearshifting to reach the first toothed wheel 201 from any lower stop position P1, P2, P3 on the second toothed wheel 202, the indexer 13 always reaches the second upper stop position P5, as schematized in FIG. 9.

From the second upper stop position P5, the indexer 13 can be switched into the first upper stop position P4 by acting on the first control lever 14 (making the latter carry out a shorter stroke than the stroke that is needed to pass from the second upper stop position P5 to the second lower stop position P2).

In order to actuate the movements described above (and other further movements or different movements of the front derailleur 300), the device 10 comprises a cable-winding bush 16, to which the control cable is fixed and on which said control cable is wound. The cable-winding bush 16 is mounted in the casing 11 fixedly connected to the control pin 12 and is angularly rotatable around the rotation axis X in the first A and in the second angular direction B.

The cable-winding bush 16 can rotate between a first angular position, in which the winding of the control cable is minimum, and a last angular position, in which the winding of the control cable is maximum, and vice-versa.

Between the first angular position and the last angular position of the cable-winding bush 16 further intermediate angular positions are provided that are distinct from one another and angularly spaced by indexing angles. The indexing angles are not all identical to one another. Every angular position of the cable-winding bush 16 corresponds to a position of the front derailleur 300 with respect to the crown gears 201, 202 of the crankset 200.

In particular, rotations in the first angular direction A correspond to downward gearshifting and rotations in the second angular direction B correspond to upward gearshifting.

The first angular position of the cable-winding bush 16 corresponds to the first lower stop position P1 of the indexer 13 and the last angular position of the cable-winding bush 16 corresponds to the second upper stop position P5 of the indexer 13.

The second lower stop position P2, the third lower stop position P3 and the first upper stop position P4 of the indexer 13 correspond to mutually consecutive intermediate angular positions of the cable-winding bush 16.

The indexer 13 comprises a ball-carrying disc 17 rotatably mounted in the casing 11 and fixedly connected to the control pin 12. Every rotation of the cable-winding bush 16 corresponds to an identical rotation of the ball-carrying disc 17 and vice-versa.

Figure 7:
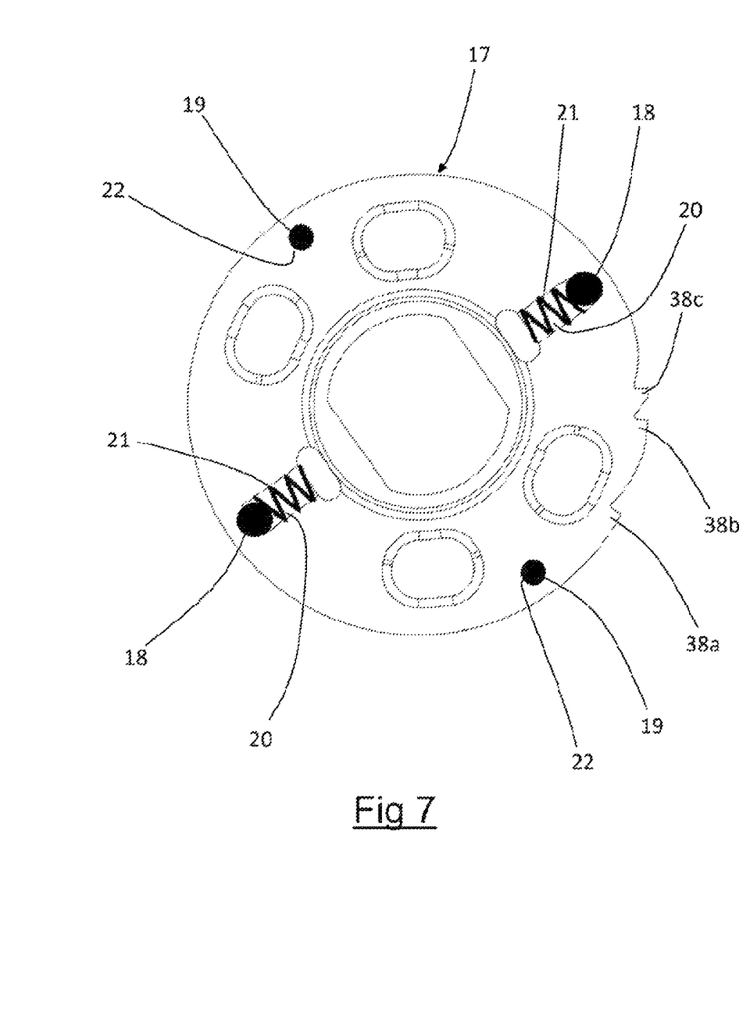
FIGS. 7 and 8 are schematic plan views of some details of the device of FIG. 1.

The ball-carrying disc 17 is substantially cylindrical and provided with a first pointer 18 and a second pointer 19 (FIG. 7). The two pointers 18, 19 are preferably spherical bodies and they will be called pointers or balls without distinction.

In the preferred embodiment of the invention, two first pointers 18 and two second pointers 19 are provided.

As far as the two first pointers 18 are concerned, in the ball-carrying disc 17 two radial grooves 20 are formed that are closed towards the outside, equal and diametrically opposite, in each of which a respective ball 18 is movably housed. The two balls 18 are elastically biased towards the outside in the grooves 20 by respective springs 21 mounted in the grooves 20. The grooves 20 are axially open on one side of the ball-carrying disc 17 so that the balls 18 partially emerge from the axial space occupied by the ball-carrying disc 17, making pointers projecting in the axial direction.

The two second pointers 19 are arranged in radially opposite housings 22 formed in the ball-carrying disc 17. The housings 22 are axially open on one side of the ball-carrying disc 17 so that the balls 19 partially emerge from the axial space occupied by the ball-carrying disc 17, making pointers projecting in the axial direction.

Each first ball 18 is angularly spaced from a second ball 19 by an angle comprised between about 30° and about 150°.

Preferably, each first ball 18 is angularly spaced from a second ball 19 by an angle of 90°, so that the four pointers 18, 19 are equally angularly spaced from one another.

The second pointers 19 are radially aligned with the first pointers 18.

As illustrated in FIG. 7, the first pointers 18 are larger in size with respect to the second pointers 19, in other words they have a greater diameter with respect to the second pointers 19.

Preferably, the diameter of the first pointers 18 is comprised between 1.1 and 2 times the diameter of the second pointers 19, more preferably it is about 1.4 times the diameter of the second pointers 19. For example, the first pointers 18 have a diameter of about 2.0 mm and the second pointers have a diameter of about 1.5 mm.

The indexer 13 further comprises an indexing bush 23 arranged inside the casing 11, fixed with the casing 11 itself, and rotatably mounted with respect to the control pin 12.

The indexing bush 23 (better illustrated in FIG. 8) comprises a fastening track 24 engaged by the first 18 and second pointers 19.

Figure 8:
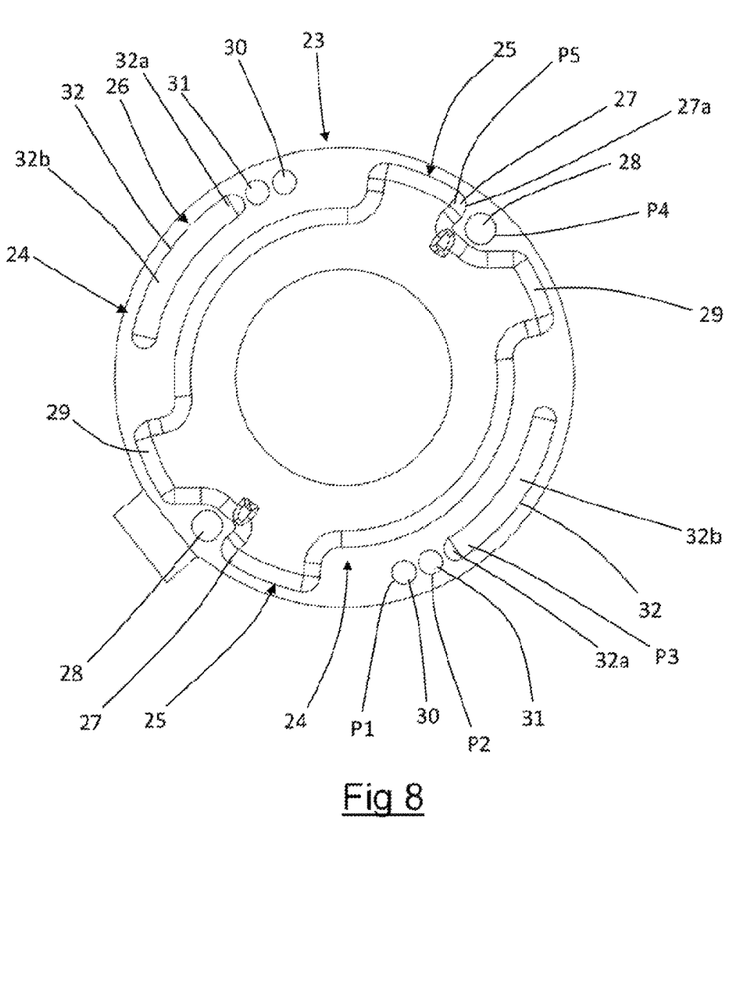

The fastening track 24 directly faces the ball-carrying disc 17. The depth of the fastening track 24 is such as to receive the portion of pointers 18, 19 that emerges axially from the ball-carrying disc 17.

The fastening track 24 comprises at least some of the stop portions P1, P2, P3, P4, P5 and in particular it comprises the first P1, the second P2, the third P3 lower stop position and the second upper stop position P5. The fastening track 24 engages the pointers 18, 19 of the ball-carrying disc 17.

The fastening track 24 comprises a first fastening path 25 and a second fastening path 26 respectively engaged by one of the two first pointers 18 and by one of the two second pointers 19.

In the preferred embodiment of the invention, two first fastening paths 25 are provided each of which is engaged by a first pointer 18 and two second fastening paths 26 are provided each of which is engaged by a second pointer 19.

The two first fastening paths 25 can be physically joined (like in the example illustrated in FIG. 8) or separate.

In any case, the two first fastening paths 25 are point-for-point identical to one another and angularly spaced by 180°, as schematized in FIG. 8.

Similarly, the second two fastening paths 26 are also point-for-point identical to one another and angularly spaced by 180°.

The following refers to a single first 25 or second fastening path 26 but it should be deemed to also refer to the other first or second fastening path.

The second upper stop position P5 is formed on the first fastening path 25. The second upper stop position P5 is defined by a curve 27, with radius of curvature preferably of about 90°, of the first fastening path 25.

The first upper stop position P4 is formed outside of the first fastening path 25 in a recess 28 angularly spaced from the curve 27 and radially aligned with the latter.

The first fastening path 25 passes radially inside the recess 28 carrying out a loop inside which the recess 28 is arranged.

The first upper stop position P4 cannot be reached by traveling along the first fastening path 25.

The first fastening path 25 further comprises a free sliding area 29 which can be slidably engaged by the first pointer 18. The free sliding area 29 is radially aligned with the second upper stop position P5 and with the first upper stop position P4.

As illustrated in FIG. 8, the first upper stop position P4 is circumferentially arranged between the second upper stop position P5 and the free sliding area 29.

The second fastening path 26 is made from a first 30 and a second recess 31 and from a circular sector 32 radially aligned with each other and radially aligned with the recess 28 that defines the first upper stop position P4.

The first recess 30 defines the first lower stop position P1 and the second recess 31 defines the second lower stop position P2.

A first portion 32a of the circular sector 32 circumferentially closest to the second recess 31 defines the third lower stop position P3.

A second portion 32b of the circular sector 32 defines a free sliding area of the second fastening path 26.

The angular distance that separates the first 30 from the second recess 31 and that separates the second recess 31 from the first portion 32a of the circular sector 32 is less than the angular distance that separates the curve 27 of the first fastening path 25 from the recess 28 that defines the first upper stop position P4.

Furthermore, preferably, the angular distance that separates the first 30 from the second recess 31 and that separates the second recess 31 from the first portion 32a of the circular sector 32 is less than the angular distance that separates the recess 28 (which defines the first upper stop position P4) from the free sliding area 29 for the first pointer 18.

In the case, not illustrated, in which the first recess 30, the second recess 31, the circular sector 32, the recess 28 that defines the first upper stop position P4, the curve 27 and the free sliding area 29 for the first pointer 18 are not radially aligned, the aforementioned angular distance must be interpreted as the distance measured along a straight line that passes through the two elements with respect to which the distance must be calculated.

As stated above, angular rotations of the cable-winding bush 16 in the first angular direction A correspond to downward gearshifting of the front derailleur 300 and rotations of the cable-winding bush 16 in the second angular direction B correspond to upward gearshifting of the front derailleur 300.

Concerning this, the second control lever 15 is angularly movable around the rotation axis X in the second angular direction B between a rest position and an active position, and angularly movable around the rotation axis X in the first angular direction A between the active position and the rest position.

The second control lever 15 rotates as a unit with the cable-winding bush 16 in the passage from the rest position to the active position and is freely rotatable with respect to the cable-winding bush 16 in the passage from the active position to the rest position, due to the presence of a clutch linkage, not illustrated since it is per se conventional and known.

The first control lever 14 acts on the ball-carrying disc 17 to allow a rotation thereof, together with the cable-winding bush 16, in the first angular direction A around the rotation axis X, so as to obtain downward gearshifting.

The first control lever 14 is mounted on a disc 33 (FIG. 1) mounted in free rotation on the control pin 12 and comprises a tooth 34 that projects radially towards the rotation axis X.

The disc 33 can rotate with respect to the control pin 12 between an upper end stop 35 and a lower end stop 36 formed in a window 37 of the casing 11 through which the first control lever 14 emerges radially.

The ball-carrying disc 23 comprises a plurality of protrusions 38*a*, 38*b*, 38*c* arranged on the radially outer surface that can be engaged by the tooth 34 of the first control lever 14.

The tooth 34 is rotatably mounted with respect to the disc 33, so as to engage the protrusions 38*a*, 38*b*, 38*c* by rotations of the disc 33 in the first angular direction A and to disengage from the protrusions 38*a*, 38*b*, 38*c* by rotations of the disc 33 in the second angular direction B.

Preferably, there are three protrusions 38*a*, 38*b*, 38*c*, in particular a first 38*a*, a second 38*b* and a third protrusion 38*c*.

By actuating the first control lever 14, the tooth 34 sets the ball-carrying disc 17 in rotation in the first angular direction A. Once downward gearshifting has occurred, the first control lever 14 goes back into the initial position through the effect of elastic members, for example a torsion spring (not illustrated).

The preferred operation of the device 10 will now be described.

During upward gearshifting from the first lower stop position P1 (condition illustrated in FIG. 2), by actuating the second control lever 15 the ball-carrying disc 17 rotates with respect to the indexing bush 23 in the second angular direction B.

Figure 2:
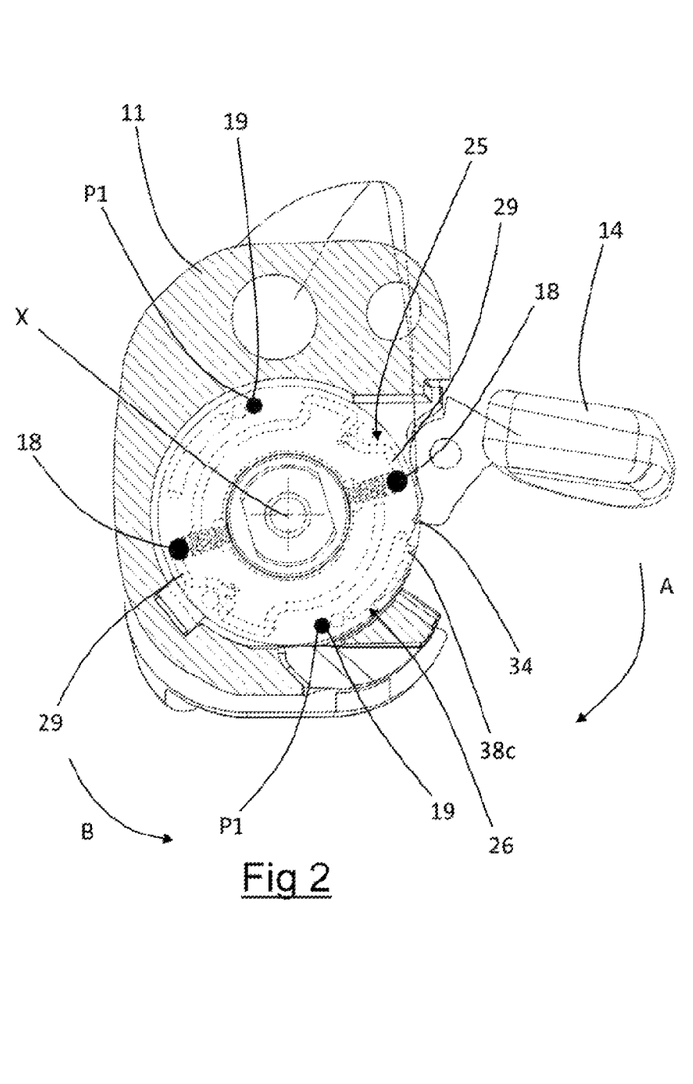
FIGS. 2 to 6 are views, with some parts removed to better highlight others, of the device of FIG. 1 in different operative conditions.

Before the actuation of the second control lever 15, the second pointers 19 are engaged in the respective first lower stop positions P1 of the second fastening path 26. The first pointers 18 are engaged in the free sliding area 29 of the first fastening path 25 (FIG. 2).

In this configuration, the cable-winding bush 16 is held in the first angular position by the engagement of the second pointers 19 in the first lower stop positions P1.

Figure 3:
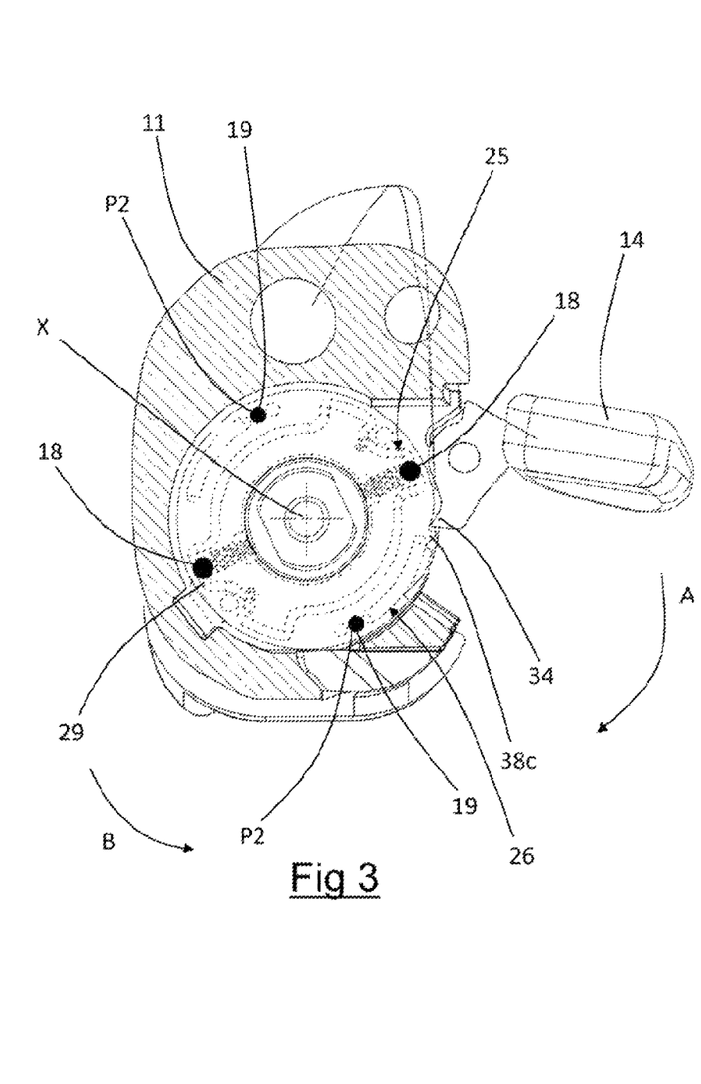

By actuating the second control lever 15, the second pointers 19 are positioned on the respective second lower stop positions P2 locking the cable-winding bush 16 in the new angular position. The first pointers 18 slide in the free sliding area 29 of the first fastening path 25 (FIG. 3).

Figure 4:
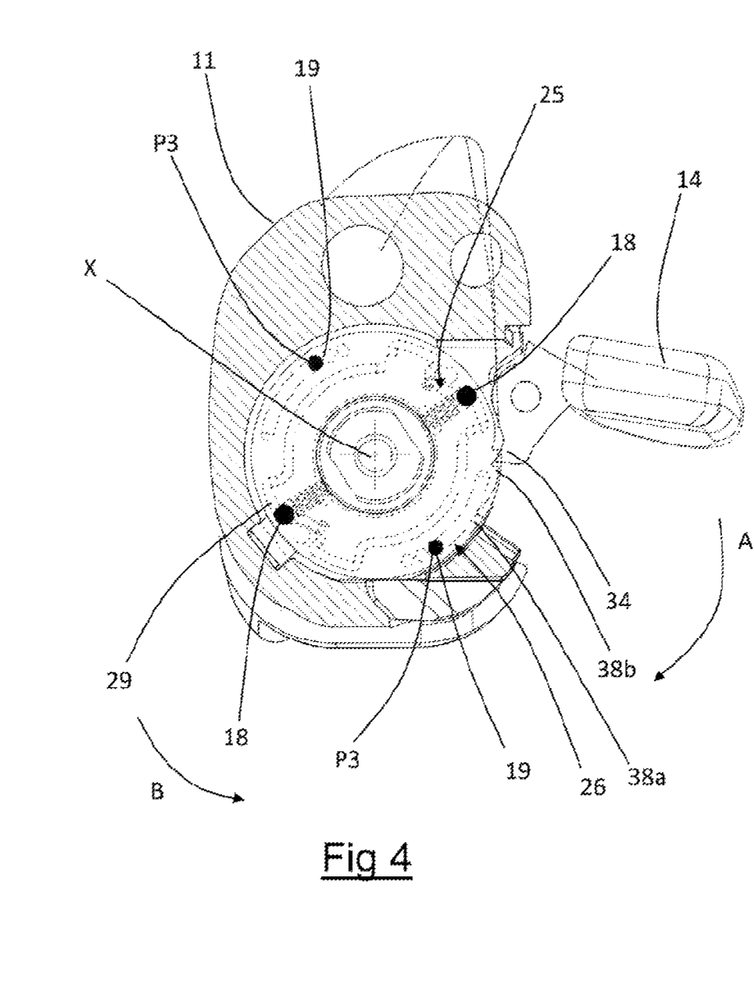

By further actuating the second control lever 15, the second pointers 19 are positioned on the respective third lower stop positions P3 locking the cable-winding bush 16 in the new angular position. The first pointers 18 slide in the respective free sliding areas 29 of the first fastening paths 25 (FIG. 4).

Figure 5:
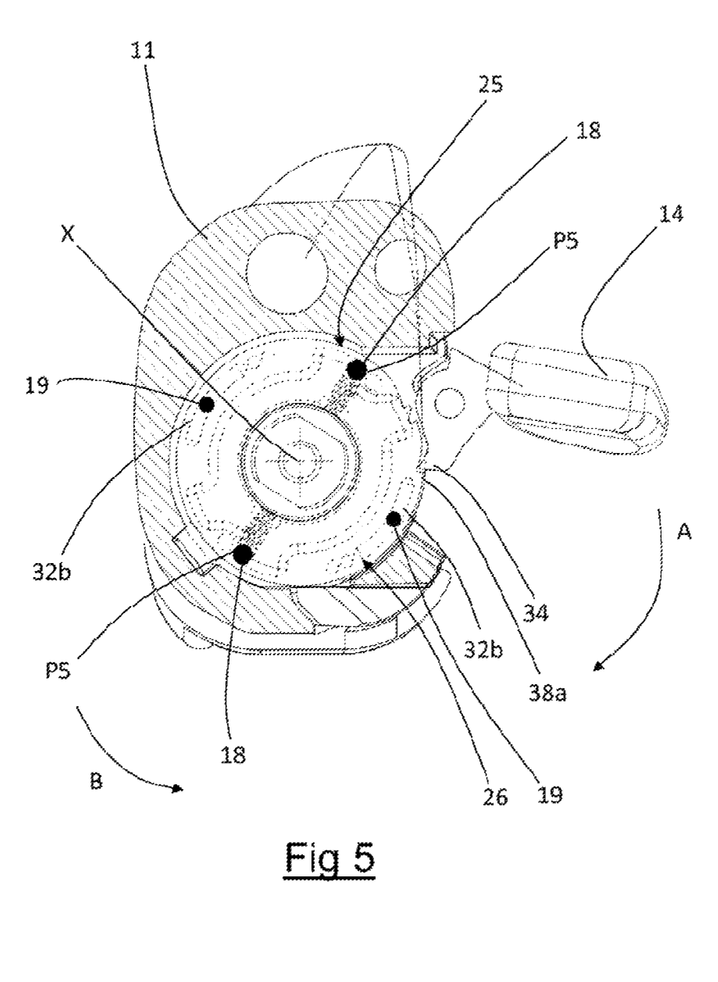

A further actuation of the second control lever 15 takes the second pointers 19 into the free sliding area 32*b* of the second fastening path 26, as shown in FIG. 5.

The first pointers 18 follow the respective first fastening paths 15 traveling along the loop that goes past the first upper stop position P4 and reaching the second upper stop position P5 (FIG. 5). The cable-winding bush 16 reaches the last angular position and is held in such a position by the engagement of the first pointers 18 with the second upper stop positions P5.

From this position the first upper stop position P4 or the second lower stop position P2 can be reached.

In the case in which it is wished to reach the first upper stop position P4 (condition illustrated in FIG. 6), the first control lever 14 is actuated in the first angular direction A.

The tooth 34 intercepts the first protrusion 38*a* of the ball-carrying disc 17 (FIG. 5) and sets the latter in rotation in the first angular direction A.

The second pointers 19 slide inside the respective free sliding areas 32*b* of the second fastening paths 26.

The first pointers 18 cannot follow the first fastening paths 25 during the rotation in the first angular direction A of the ball-carrying disc 17, since they find a shoulder 27*a* given by the curve 27 (which makes the second upper stop position P5) that opposes the sliding of the pointers. The first pointers 18 are forced, under the action of the cable-winding bush 16 to pass over the shoulders 27*a* to follow the rotation imposed by the cable-winding bush 16. The disengagement of the first pointers 18 from the first fastening paths 25 takes place in opposition to an elastic force exerted by an elastic member (not illustrated) that presses the ball-carrying disc 17 axially against the indexing bush 23.

Such passing over leads the first pointers 18 to be arranged in radially outer position in the grooves 20 of the ball-carrying disc 17 and to travel along a circumferential trajectory when the cable-winding bush 16 rotates along the first angular direction A. The first pointers 18 thus reach the first upper stop positions P4 locking the cable-winding bush 16 in the angular position reached.

It should be noted that the rotation imparted by the first control lever 14 to the ball-carrying disc 17 is actuated until the first pointers 18 reach the first upper stop position P4 and then is interrupted. During the imparted rotation, the tooth 34 of the first control lever 14 is always in abutment on the first protrusion 38*a* of the ball-carrying disc 17.

The release of the first control lever 14 causes the rotation of the latter in the second angular direction B (with the ball-carrying disc 17 locked in the angular position reached).

Figure 6:
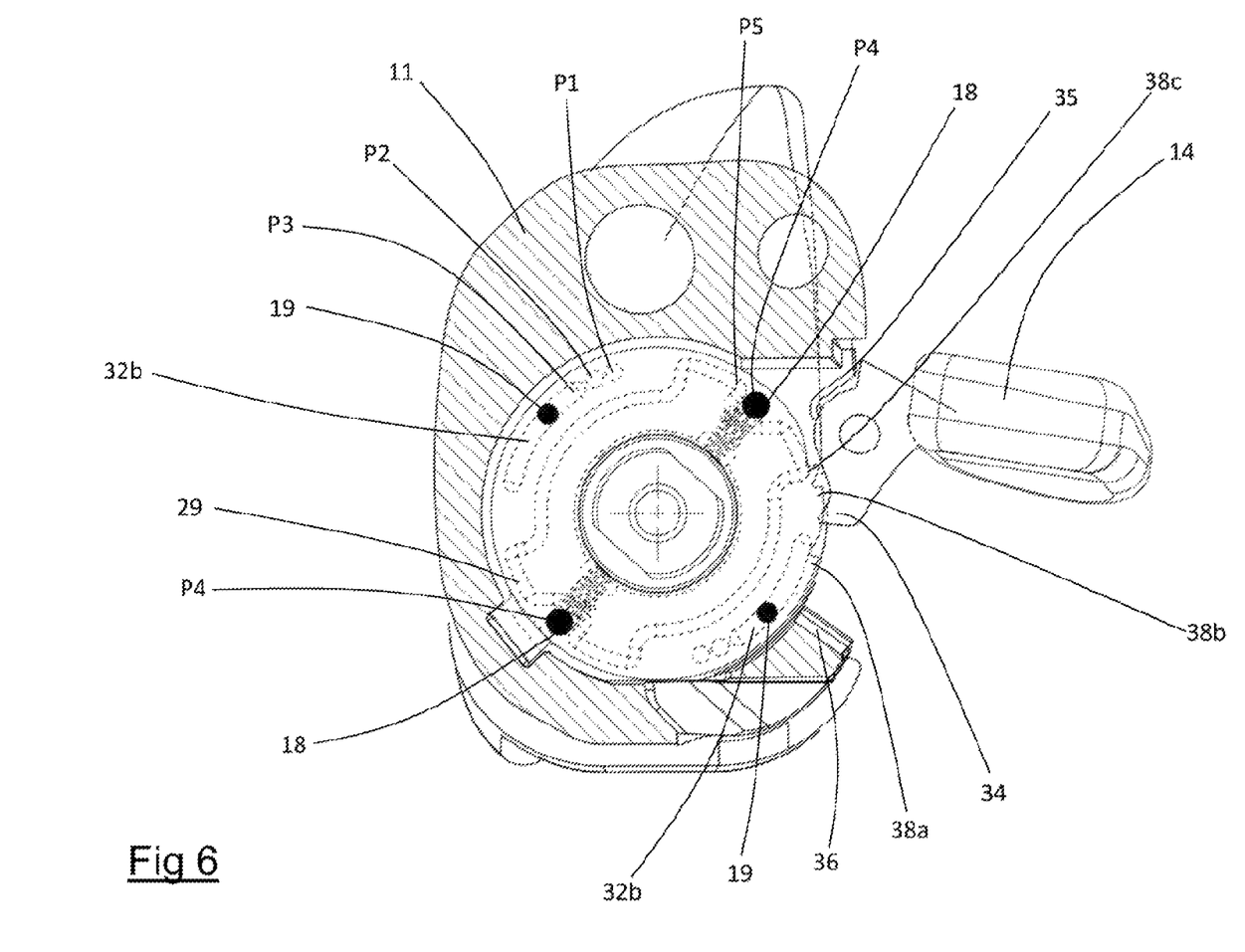

As shown in FIG. 6, the angular distance that separates the first protrusion 38*a* from the second protrusion 38*b* of the ball-carrying disc 17 is greater than the angular excursion carried out by the first control lever 14 in the second angular direction B to take the first pointers 18 from the second upper stop position P5 to the first upper stop position P4.

In other words, the angular distance (measured along the first angular direction A) that separates the second upper stop position P5 from the first upper stop position P4 is less than the angular distance (in the same direction) that separates the second protrusion 38b from the first protrusion 38a of the ball-carrying disc 17.

In the case in which it is wished to reach the second lower stop position P2 (condition illustrated in FIG. 3) from the second upper stop position P5, the first control lever 14 is actuated in the first angular direction A.

The tooth 34 intercepts the first protrusion 38a of the ball-carrying disc 17 (FIG. 5) and sets the latter in rotation in the first angular direction A.

As stated above, the second pointers 19 slide inside the respective free sliding areas 32b of the second fastening paths 26.

The first pointers 18 ride over the shoulders 27a to follow the rotation imposed by the cable-winding bush 16 reaching the first upper stop positions P4.

Continuing the action on the first control lever 14 (the tooth 34 of which continues to be engaged on the first protrusion 38a of the ball-carrying disc 17), the second pointers 19 reach the third lower stop position P3 and, passing over it, reach the second lower stop position P2 where they lock the cable-winding bush 16 in rotation (FIG. 3).

At the same time, the first pointers 18 come out from the recesses 28 that define the first upper stop position P4 and enter into the respective first fastening paths 25 at the free sliding areas 29.

During the passage from the second upper stop position P5 to the second lower stop position P2, the rotation imparted by the first control lever 14 to the ball-carrying disc 17 is actuated until the control lever 14 reaches the lower end stop 35 arranged on the casing 11.

The release of the first control lever 14 causes the rotation of the latter in the second angular direction B (with the ball-carrying disc 17 locked in the angular position reached).

As shown in FIG. 3, the rotation of the first control lever 14 in the second angular direction B (which proceeds until the first control lever 14 reaches the upper end stop 36), takes the tooth 34 to the third protrusion 38c of the ball-carrying disc 17.

The angular distance that separates the first protrusion 38a from the third protrusion 38c of the ball-carrying disc 17 is substantially equal to the angular excursion carried out by the first control lever 14 between the upper end stop 36 and the lower end stop 35.

In other words, the angular distance (measured along the first angular direction A) that separates the second upper stop position P5 from the second lower stop position P2 is substantially equal to the angular distance (in the same direction) that separates the third protrusion 38c from the first protrusion 38a of the ball-carrying disc 17.

From the second lower stop position P2, the first lower stop position P1 can be reached by actuating the first control lever 14 in the first angular direction A. The tooth 34 of the first control lever 14 is engaged on the third protrusion 38c of the ball-carrying disc 17 (FIG. 3). The ball-carrying disc 17 therefore rotates in the first angular direction A reaching the first lower stop position P1 (FIG. 2).

It should be noted that the actuation of the first control lever 14 is hindered once the first lower stop position P1 has been reached by the lower end stop 301 of the front derailleur 300 (which prevents further displacements of the derailleur itself and therefore of the control device 10 in the first angular direction A).

It should be noted that from the first upper stop position P4 (FIG. 6), the actuation of the first control lever 14 takes the ball-carrying disc 17 into the second lower stop position P2 (FIG. 3). Indeed, the first control lever 14 carries out a first excursion in the first angular direction A without engaging any protrusion of the ball-carrying disc 17 and thus without setting it in rotation. The rotation of the ball-carrying disc 17 begins (following what has already been stated above in the passage from the second upper stop position P5 to the second lower stop position P2) when the tooth 34 intercepts the first protrusion 38a of the ball-carrying disc 17.

Of course, those skilled in the art, in order to satisfy specific and contingent requirements, can bring numerous modifications and variants to the invention described above, like for example providing for the further stop position in a curve of the first fastening path, all in any cased encompassed by the scope of protection of the present invention as defined by the following claims.

What is claimed is:

1. A device for actuating a front derailleur of a bicycle to displace a transmission chain between a first toothed wheel and a second toothed wheel of a smaller diameter, the actuation device comprising:

an indexer operatively associated with a front derailleur and comprising a first lower stop position (P1), a second lower stop position (P2), and a third lower stop position (P3) at which a transmission chain is engaged on the second toothed wheel, wherein the second lower stop position (P2) is configured to center the front derailleur on the second toothed wheel, and the second lower stop position (P2) is arranged between the first lower stop position (P1) and the third lower stop position (P3);

said indexer comprising a first upper stop position (P4) corresponding to an engagement of the transmission chain on the first toothed wheel;

at least one control lever operatively active on said indexer to switch said indexer between the first lower stop position (P1), the second lower stop position (P2) and the first upper stop position (P4), wherein with a single actuation of the control lever switches said indexer from the first upper stop position (P4) to the second lower stop position (P2).

2. The actuation device according to claim 1, wherein said indexer comprises a second upper stop position (P5) at which the transmission chain is engaged on the first toothed wheel; said second upper stop position (P5) being further from the second lower stop position (P2) with respect to the first upper stop position (P4); and a single actuation of the control lever switches the indexer from the second upper stop position (P5) to the second lower stop position (P2).

3. The actuation device according to claim 1, wherein said indexer comprises a second upper stop position (P5) at which the transmission chain is engaged on the first toothed wheel; said second upper stop position (P5) being further from the second lower stop position (P2) with respect to the first upper stop position (P4); and a single actuation of the control lever switches the indexer from a second upper stop position (P5) to the second lower stop position (P2).

4. The actuation device according to claim 3, wherein the first upper stop position (P4) can only be reached from the second upper stop position (P5).

5. The actuation device according to claim 2, comprising:
a cable-winding bush actuated by said at least one control lever to rotate around a rotation axis (X) in a first angular direction (A) between a last angular position, corresponding to the second upper stop position (P5) of the indexer, and a first angular position, corresponding to the first lower stop position (P1) of the indexer, and in a second angular direction (B) between the first angular position and the last angular position;

wherein said indexer comprises:

a ball-carrying disc, rotating as a unit with said cable-winding bush, comprising at least one pointer;

an indexing bush provided with a fastening track engaged by said pointer and comprising at least some of said lower and upper stop positions (P1, P2, P3, P4, P5) to stop said ball-carrying disc at some of said lower and upper stop positions (P1, P2, P3, P4, P5).

6. The actuation device according to claim 5, wherein said fastening track comprises a first fastening path and a second fastening path; said ball-carrying disc comprising a first pointer engaged on said first fastening path and a second pointer engaged in said second fastening path.

7. The actuation device according to claim 6, wherein said second pointer is smaller in size with respect to said first pointer.

8. The actuation device according to claim 6, wherein said first lower stop position (P1) and said second lower stop position (P2) and said second lower stop position (P2) and third lower stop position (P3) are angularly separated from one another by angles smaller than an angle that separates the first upper stop position (P4) from the second upper stop position (P5).

9. The actuation device according to claim 6, wherein said first (P1), second (P2) and third lower stop position (P3) are formed on said second fastening path and wherein said second upper stop position (P5) is formed on the first fastening path.

10. The actuation device according to claim 6, wherein said first upper stop position (P4) is formed outside of said first fastening path and is radially aligned with said second upper stop position (P5).

11. The actuation device according to claim 9, wherein said first fastening path comprises a free sliding area for said first pointer; said first pointer engaging said free sliding area when the second pointer is in the first (P1), second (P2) or third lower stop position (P3).

12. The actuation device according to claim 9, wherein said second fastening path comprises a free sliding area for said second pointer; said second pointer engaging said free sliding area when the first pointer is in one of the first upper stop position (P4) or the second upper stop position (P5).

13. The actuation device according to claim 5, comprising a first control lever to set said cable-winding bush in rotation in the first angular direction (A) and a second control lever to set said cable-winding bush in rotation in the second angular direction (B); wherein said first control lever is directly active on said ball-carrying disc.

14. The actuation device according to claim 13, wherein said ball-carrying disc comprises a plurality of protrusions engageable by a tooth of the first control lever; the ball-carrying disc rotating in said first angular direction (A) following the engagement of said tooth in one of said protrusions upon actuation of the first control lever in the first angular direction (A).

15. The actuation device according to claim 14, wherein said first control lever is rotatable around said rotation axis (X) between an upper end stop and a lower end stop; the angular distance that separates the upper end stop from the lower end stop being equal to the angular distance between the second upper stop position (P5) and the second lower stop position (P2).

16. The actuation device according to claim 1, comprising:

a cable-winding bush actuated by said at least one control lever to rotate around a rotation axis (X) in a first angular direction (A) between a last angular position, corresponding to a second upper stop position (P5) of the indexer, and a first angular position, corresponding to the first lower stop position (P1) of the indexer, and in a second angular direction (B) between the first angular position and the last angular position;

wherein said indexer comprises:

a ball-carrying disc, rotating as a unit with said cable-winding bush, comprising at least one pointer;

an indexing bush provided with a fastening track engaged by said pointer and comprising at least some of said lower and upper stop positions (P1, P2, P3, P4, P5) to stop said ball-carrying disc at some of said lower and upper stop positions (P1, P2, P3, P4, P5).

* * * * *